FIG. I

Bernard L. Harris
John W. Taylor, Jr
INVENTORS

Bernard L. Harris
John W. Taylor, Jr.
INVENTORS.

United States Patent Office 3,502,854
Patented Mar. 24, 1970

3,502,854
PHASE RECORDING SYSTEM
Bernard L. Harris and John W. Taylor, Jr., Baltimore, Md., assignors to the United States of America as represented by the Secretary of the Army
Continuation-in-part of application Ser. No. 405,306, Oct. 20, 1964. This application Mar. 14, 1969, Ser. No. 814,494
Int. Cl. H03k 13/02
U.S. Cl. 235—154                               15 Claims

ABSTRACT OF THE DISCLOSURE

This invention relates to the recording of phase data of radar echoes or signals of a similar nature. The present invention uses two phase detector outputs which are compared to determine which is closest to a reference level. The data of that one is selected for recording, while the data from the other one furnishes information on quadrant and dictates the data processing required before recording.

CROSS REFERENCE TO RELATED APPLICATION

Figure 1:
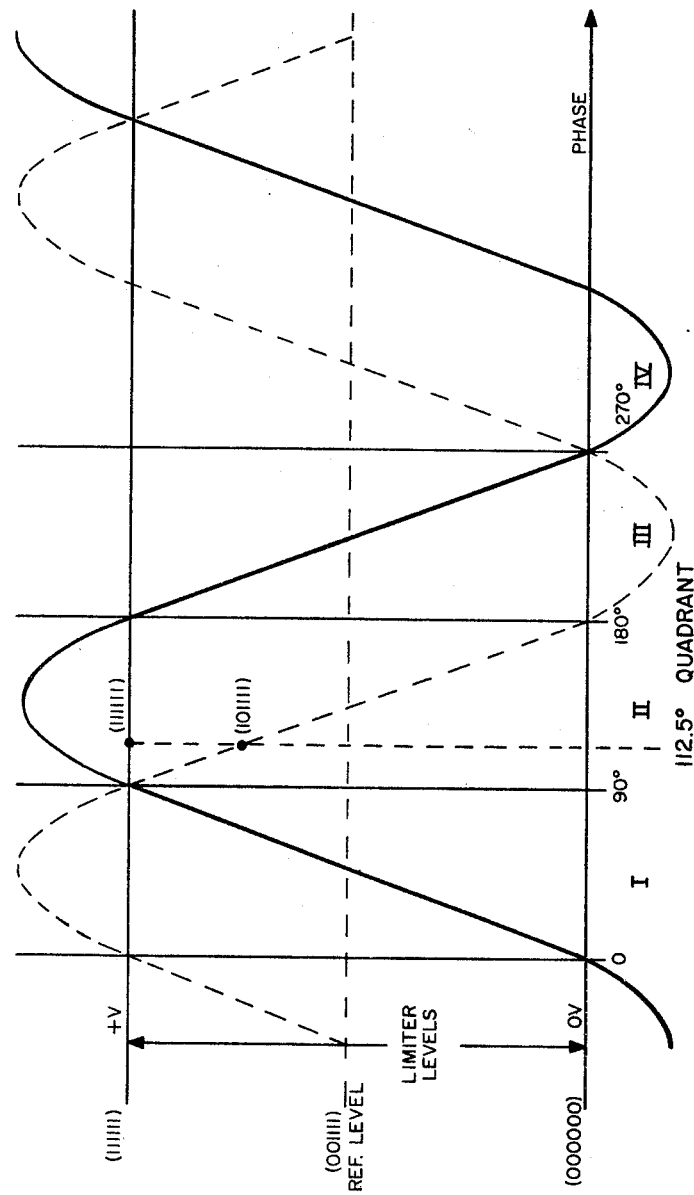

This application is a continuation-in-part of our now abandoned patent application of the same title, said application having been filed Oct. 20, 1964, and bearing Ser. No. 405,306.

In the recording of phase data of radar echoes, receivers of these signals commonly convert the carrier frequency to the region of 15-60 mc., where amplification may be obtained at minimum cost, size and weight. Phase detectors are available for these bands of frequencies, but their outputs (a of FIGURE 1) are sinusoidal functions of the phase difference between the signal and reference frequency. Any specified output represents one of two possible phase conditions, so an ambiguity exists which must be eliminated. Further, the detector output becomes insensitive to a change in input phase in two regions; it is accurate for only about 80% of all possible phase inputs. These problems are commonly solved by the use of a pair of phase detectors; the reference to one being shifted 90° to produce a cosine curve (b of FIGURE 1). However, this provides two outputs, only one of which contains accurate data. Where efficient recording of data is necessary, the two pieces of phase data must be combined to avoid waste of storage space in a computer.

It is an object of the present invention to provide a system whereby the phase data of echoes of a radar may be measured and recorded.

It is a further object of this invention to provide a system whereby two pieces of phase data are combined to avoid waste of storage space in a computer system.

Figure 2:
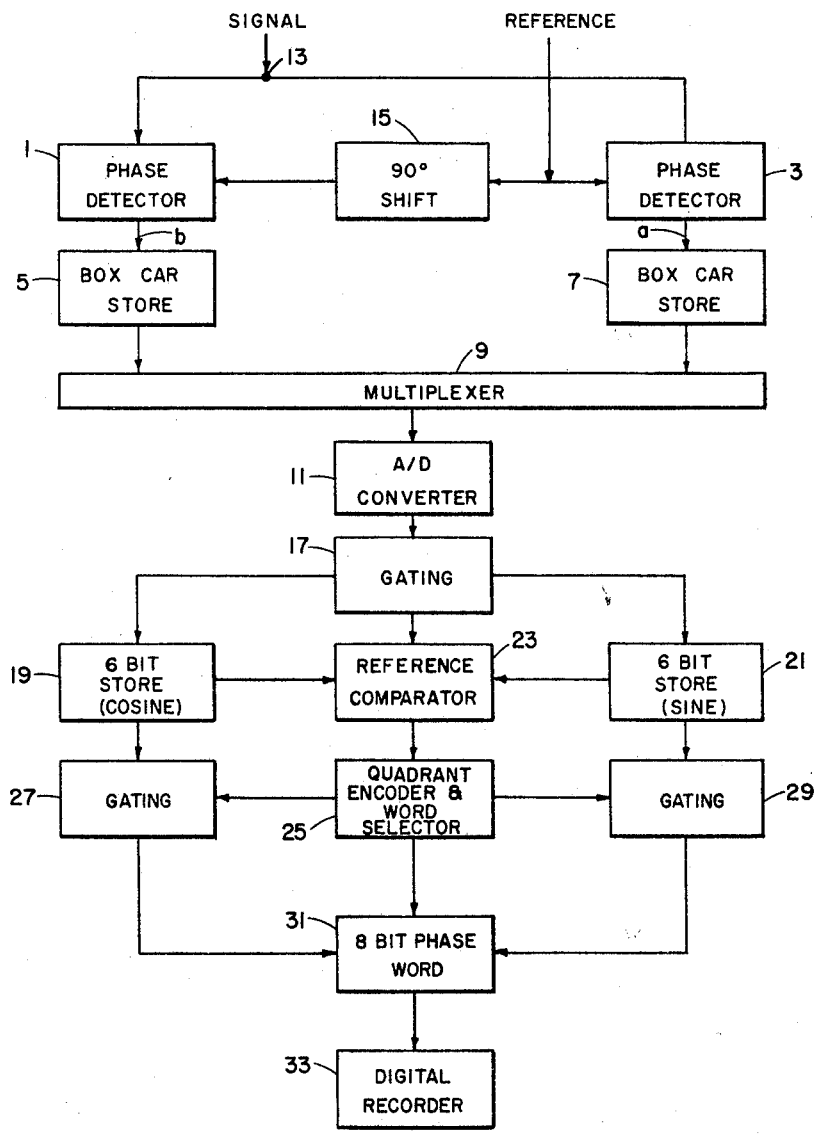
Figure 3A:
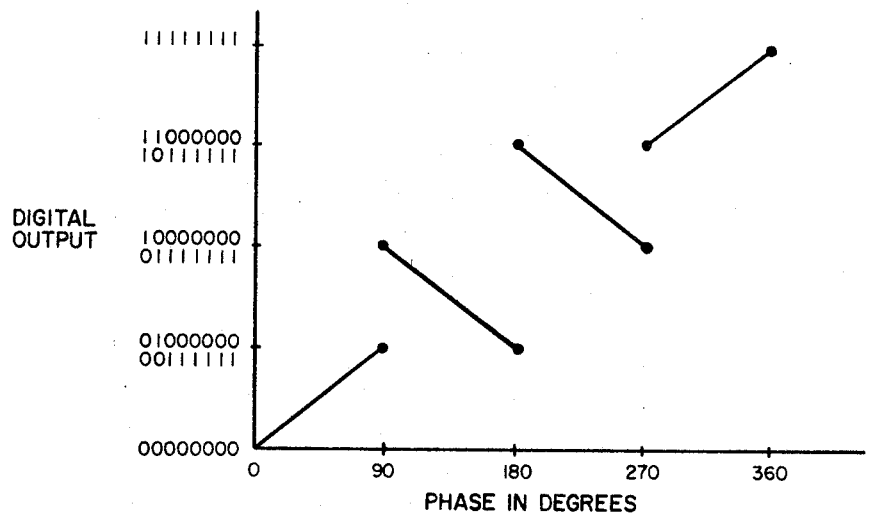
Figure 3B:
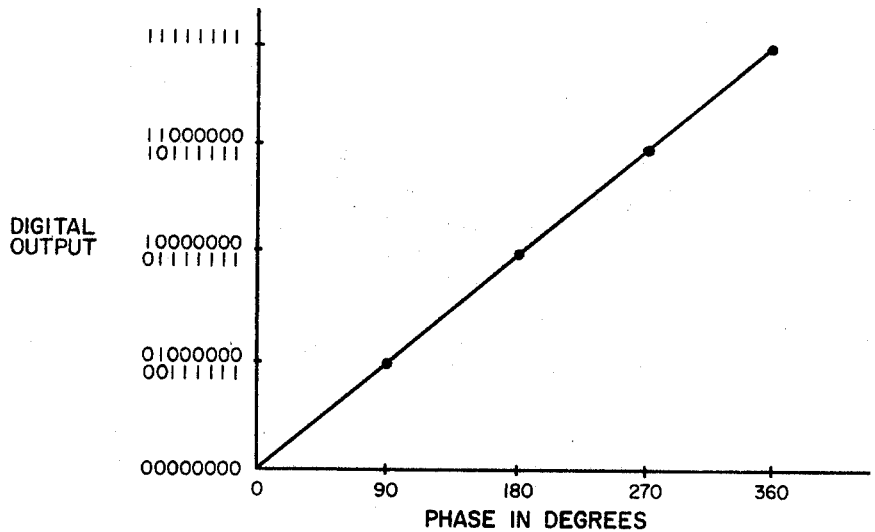
Figure 4:
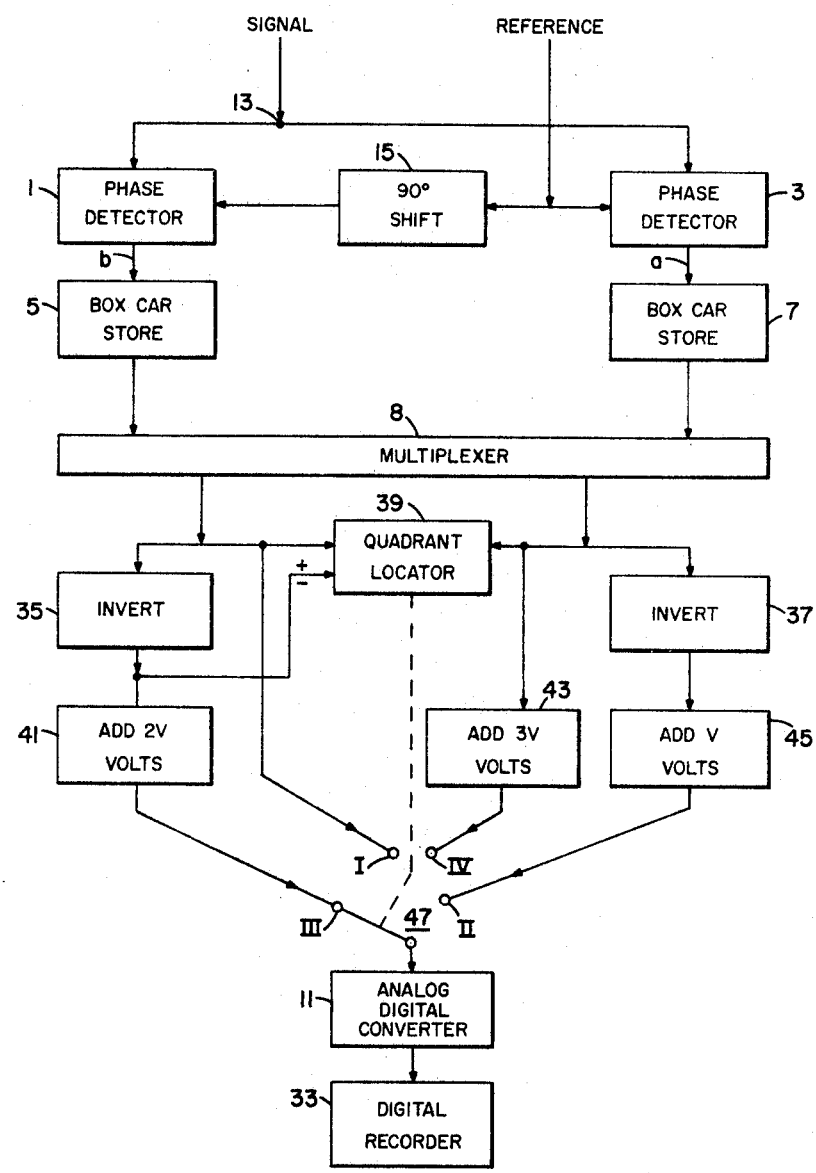

The various features of novelty which characterize this invention are poined out with particularity in the claims annexed to and forming a part of this specification. A better understanding of the advantages, specific objects obtained with use of, and many of the attendant advantages of this invention will be readily appreciated as the same becomes better understood by reference to the following detailed description when considered in connection with the accompanying drawing in which like reference numerals designate like parts through the figures thereof and wherein:

FIGURE 1 shows the waveforms of the detectors;
FIGURE 2 illustrates a system, in block diagram, according to the invention.
FIGURES 3A and 3B illustrate the waveforms of signals derived from the circuits of FIGURES 2 and 4; and
FIGURE 4 shows a system in block diagram illustrating one preferred form of the invention.

Phase detectors provide outputs which vary cyclically with phase, typically as illustrated in FIGURE 1. As a consequence, a pair of phase detectors 1 and 3 of FIGURES 2 and 4, staggered by 90°, are required to supply unambiguous phase data. One or the other of the outputs contains the accurate phase information; the alternate removes the ambiguity.

Some systems require measurement and recording of phase data to a high degree of accuracy (1.5° for example). Digital recording systems are most attractive for these accuracies, so an analog/digital converter must transform the phase detector output (covering in excess of 90°) into a 6 bit word. If the output of each phase detector is individually recorded, 12 bits are placed on a storage tape in a digital recorder 33. However, the data is really only recorded to only 8 bit precision (1.5° in 360°), because one of the two 6 bit words merely establishes quadrant (2 bits worth of information). This approach represents considerable inefficiency in data recording, resulting in excessive demands on storage capacity and either time or bandwidth.

The present disclosure describes a system for recording only the pertinent information: 6 bits from the phase detector whose output is most precise and 2 bits of quadrant data supplied by the alternate. One unique feature of the invention is its ability to select which of the phase detectors contains the precise data (quadrant I and III of curve a and II and IV of curve b) and which contains the quadrant information only. The logic employed for this selection may operate on either analog or digital information, but only the digital form will be described in detail; the analog equivalent is obvious.

The logic of this invention is based on the fact that the most precise information is available from the phase detector whose output is closest to the center of its linear region for 90 degrees. This criterion for selection is superior to other possible alternatives in that it forces the selection of one and only one of the two possible choices. If each of the phase detector outputs were compared against a separate standard, neither or both might indicate that they were in a precise region and additional complexity would be required to force a decision. Comparison of the two outputs with each other demands a decision.

In order to simplify the digital data recording process the output of the phase detectors may be limited at 0 and +V as shown in FIGURE 1. This allows all the information to be contained in only one of the phase outputs and the second merely to represent the quadrant by indicating saturation either + or —. Also to eliminate the need for a bipolar A/D converter, the phase detector outputs are displaced to be always positive with respect to ground within the limit levels. The reference voltage is selected so as to equal ½ the voltage span of the phase detectors' output during 90° of their most lineral region.

Efficient recording is usually a requirement when a large number of pieces of data are involved. One system on which the invention may be employed involves a large number of phase detectors which receive data simultaneously but with intervals of three milliseconds between data inputs to the disclosed device as some systems may capacitor) stores 5 and 7 and a multiplexer 9 to convey this data into sequential form so that a single analog-to-digital (A/D) converter 11 may be employed. This should be considered only as an illustrative example of possible data inputs to the disclosed device at some systems may provide the phase data directly in the necessary sequential form without this multiplex operation.

OPERATION

A signal at junction 13 of FIGURE 2 enters two phase detectors 1 and 3. This signal may be an echo from a radar system or the like. Phase detector 3 is fed with a reference source. Phase detector 1 is supplied by the same reference source but with it being shifted 90° by a shift means 15. The relative level of the reference source is shown in FIGURE 1. The outputs b and a of the phase detectors 1 and 3 are fed boxcar stores 5 and 7. The data in these stores are alternately sampled by multiplexer 9. The data is converted into sequential form by analog multiplexer 9 so that a single analog-to-digital converter 11 can convert the data. Converter 11 provides a 6 bit digital signal. The output of the A/D converter 11 is fed through gating means 17 to the 6 bit store buffer units 19 and 21. Gating 17 directs the 6 bit output of the single A&D converter 11 to the buffer units by standard digital processes. The outputs of these buffer units are compared by a reference comparator 23 which sends its output to a quadrant encoder and word selector 25. A clock signal, indicating that the pair of digital words have been inserted into their storage elements and that the novel data-combining process may begin, is received either from the synchronizer (not shown) or from gating device 17. This is the signal shown from 17 to 23 in FIGURE 2. The selector 25 controls the outputs of gating circuits 27, 29 and 31 so that the signal which is closest to the reference level (001111 of FIGURE 1) will be gated for six bit voltage information and the other signal will be gated for a two bit quadrant information. This makes up the 3 bit phase word in 31 which is fed to a digital recorder 33. Reference Comparator 23 and Quadrant Locator 39 are digital decision circuits which determine whether each input signal from the stores 19 and 21 is above or below the predetermined reference level shown in FIGURE 1. The decisions may be made in parallel or in sequence, dictated solely by the speed requirements. For 23, the circuit is a digital subtractor, and for 39, a voltage threshold. As a result of the independent decisions on the two input signals, digital logic generates a two-bit word defining quadrant. These are used as the two most significant bits of the 8 bit phase word. They also control which of the gating sources 27 and 29 supplies the remaining 6 bits and whether the data is inverted or not, as illustrated by FIGURE 3. Analog multiplexer 9 taken with gating means 17 (which 17 may also be described as a digital multiplexer), enable the single A/D converter 11, which 11 may produce either serial or parallel output, to be utilized alternately by each phase detector. The sequence is not a novel feature of the invention; a pair of A/D converters could be employed to operate simultaneously rather than multiplexing a single device sequentially. These elements are merely one example of standard devices for converting the analog outputs of the two phase detectors 1 and 3 into digital equivalents, existing simultaneously in storage elements 19 and 21.

The system as described above will produce a curve as shown in FIGURE 3A. This is a true non-ambiguous curve even though it includes large discontinuities. If the complement of the phase words for quadrants II and III were used, a linear phase curve as shown in FIGURE 3B would result. It should be understood that FIGURE 2 omits all circuit interconnections which are so conventional that their presence may be presumed. These interconnections include power supply voltages to all blocks except 15, which 15 is a passive device. Also a master synchronizer (not shown) provides timing signals to elements (blocks) 5, 7, 9, 11, 17, 19, 21, 23, 25, 27, 29, 31 and 33 of FIGURE 2. The purpose of the timing signals is to insure that each block processes the signal at appropriate times. For example, in FIGURE 2, one pair of boxcars 5 and 7 sample the outputs of the phase detectors 1 and 3 at the same instant. The other pairs of boxcars may be sampling different times, depending upon the radar. Multiplexer 9 is a device to sequentially sample a large number of pairs of phase detectors in time sequence. Thus, the disclosed system can process the phase data from a large number of data sources which, in the radar case, represent different resolution cells from which echoes are being received. The pair of boxcar stores 5 and 7 are sampled in sequence and then the multiplexer moves on to the pair (not shown) corresponding to the next resolution cell.

An analog approach to the problem is illustrated in FIGURE 4. Operation is on the same logical criterion of determining the output closest to the center of the linear region of the phase detector curve. The primary advantage of this analog approach is that the process of discarding worthless data can be accomplished sooner; the analog-digital converter need process only half the number of phase words. The dual multiplexer 8 selects one pair of input signals and provides a pair of output signals, which are the analog equivalents of the signals provided by stores 19 and 21 in FIGURE 2. These are the data inputs to the novel circuitry. The outputs of multiplexer 3 are fed to inverters 35 and 37, quadrant locator 39, add 3V volts means 43, and to terminal I of switch means 47. The two signals out of the dual multiplexer 3 are compared by the quadrant locator 39 to determine which is closest to the reference level, where the phase detector is most accurate. This signal's data is selected for recording and the quadrant location is indicated by the addition of V, 2V, or 3V volts by the add volts means 41, 43, and 45. If the signal is in the first quadrant, it is fed to switch I without any additional voltage added to it. In quadrants II and III the signal is inverted by invert means 35 and 37 so that the input to the analog-digital converter 11 from switch 47 is the curve shown by FIGURE 35. The output of the analog-digital converter 11 is fed to a digital recorder 33.

The logical process of the system of FIGURE 4 uses analog circuitry to perform; first, quadrant location by determination of whether the sine or cosine data is closest to the reference ($V/2$) and by recognition of whether the alternate input is above or below the reference; second, inversion of the phase detector outputs for quadrants II and III; and third, addition of a quadrant voltage to the processed phase detector data: V volts for quadrant II, 2V for quadrant III and 3V for quadrant IV.

A master synchronizer (not shown) provides timing signals to blocks 5, 7, 8, 11, 33, and 39 of FIG. 4 and a power supply (not shown) provides voltages to all blocks except 15, as in FIGURE 2.

EXAMPLE

Consider an example with an input phase of 112.5°. If the analog-digital converter is properly matched to the phase detectors, the readings at 0°, 90°, 180°, and 270° will be either 000000 or 111111 (0 or +V in FIGURE 1). At 112.5°, the cosine output will be 101111 and the sine will be 111111, the largest number the analog-digital converter will put out. The reference comparator of FIGURE 2 then makes the decision by digital logic that the cosine number deviates the least from the reference, 001111. This indicates that the phase is either in quadrants II or IV and the cosine data is the precise one. Secondly, it recognizes the fact that the sine data is more positive than the reference, which means that the quadrant is II, not IV. FIGURE 1 shows graphical representation for the above example.

In quadrants II and III, the slope of the phase detector is negative. To produce the continuous recording characteristic of 3B, the data must be inverted in these quadrants. This is accomplished by taking the complement of the digital input (101111) to form 010000.

Next the quadrant bits are added, preceding the above bits to form a digital phase word, wherein:

Quadrant I—00

Quadrant II—01

Quadrant III—10

Quadrant IV—11

In the above example, the answer is 01010000. The bits carrying ones represent 90°+22.5°=112.5°.

We claim:

1. A phase recording system comprising first and second phase detectors; a signal, whose phase with respect to a reference frequency is to be recorded, connected to an input of each detector; first means for shifting the detected phase of said first phase detector; second means for converting outputs of said detectors into first and second digital words; third means for comparing said digital words so as to select one word for phase information and part of the other digital word for quadrant information; and fourth means for combining said phase information and said quadrant information into a single digital word for recording.

2. A phase recording system as set forth in claim 1, wherein said phase detectors have outputs which are sinusoidal functions of the phase difference between the signal and the reference frequency.

3. A phase recording system as set forth in claim 2, wherein said reference frequency is connected to said first phase detector and is connected to said second phase detector by way of said first means.

4. A phase recording system as set forth in claim 3, wherein said first means is a 90° phase shifting means.

5. A phase recording system as set forth in claim 4, wherein said second means is an analog-digital convertor.

6. A phase recording system as set forth in claim 5, further comprising first and second bit store means each having an input connected to said second means by way of a first gating means; said first and second digital words being gated to said first and second bit store means respectively; and second and third gating means connecting outputs of said bit store means to said fourth means.

7. A phase recording system as set forth in claim 6, wherein said third means controls gating of second and third gating means.

8. A phase recording system comprising first and second phase detectors having first and second outputs; a signal, whose phase is to be recorded with respect to a reference frequency, connected to an input of each detector, wherein said phase detectors have outputs which are sinusoidal functions of the phase difference between the signal and the reference frequency; first means for shifting the detected phase of said first phase detector 90°; second means connected to said first detector for feeding the output of said first detector to first and second terminals by way of first and second circuit means; third means connected to said second phase detector for feeding its output to third and fourth terminals by way of third and fourth circuits means; and a quadrant locator having inputs connected to said second and third means whereby upon comparison of the outputs of said detectors by the locator one of said terminals is caused to be connected to a load device; wherein said second and third means include a dual multiplexer having two outputs.

9. A phase recording systems as set forth in claim 8, wherein said first circuit means is a add two V unit, said second circuit means is a direct connection, said third circuit means is a add three V unit, and said fourth circuit means is a add one V unit; wherein V equals a constant DC voltage equal to the maximum voltage said function will reach during 90° of their most lineral region of their curve if started at zero.

10. A phase recording system as set forth in claim 9, wherein said load is a recording means.

11. A phase recording system as set forth in claim 9, wherein said load consists of an analog-digital converter and a digital recorder.

12. A phase recording system as set forth in claim 11, wherein said reference frequency is connected directly to said second phase detector and is connected to said first phase detector by way of said first means.

13. A method of recording a phase difference between a reference frequency and a signal comprising the steps of detecting said phase difference in sinsoidal functions by first and second phase detectors; phase shifting an output of one of said phase detectors so that its output is a cosine function; selecting a phase detector's output which is closest to its center of its linear region for phase data to be recorded; and selecting the other phase detector's output for quadrant data to be recorded and recording the selected data.

14. A method of recording as set forth in claim 13, further comprising the step of combining the phase and quadrant data into a single digital word to be recorded.

15. A method of recording a phase difference between a reference frequency and a signal comprising the steps of: detecting said phase difference in sinusoidal functions by first and second phase detectors; phase shifting an output of one of said phase detectors so that its output is a cosine function; selecting a reference voltage which is ½ the voltage of said functions during 90° of their most lineral region; detecting quadrant location by determining whether the sine or cosine function is closest to said reference voltage and whether the alternate function is above or below the reference; selecting the function closest to said reference for recording; inverting the selected function when the detected quadrant is second and when the detected quadrant is third; adding to the selected function twice the reference voltage for a detected second quadrant, four times said reference when the detected quadrant is third, and six times the reference when the detected quadrant is fourth; and recording the selected function as modified.

References Cited

UNITED STATES PATENTS

| | | | |
|---|---|---|---|
| 2,993,279 | 7/1961 | Bower | 235—154 |
| 3,152,324 | 10/1964 | Webb | 340—347 |
| 3,399,299 | 8/1968 | Nichols | 340—347 |

MAYNARD R. WILBUR, Primary Examiner

J. GLASSMAN, Assistant Examiner

U.S. Cl. X.R.

324—83; 340—347